(12) United States Patent
Kuo et al.

(10) Patent No.: US 8,633,286 B2
(45) Date of Patent: Jan. 21, 2014

(54) CATALYST COMPOSITIONS COMPRISING SUPPORT MATERIALS HAVING AN IMPROVED PARTICLE-SIZE DISTRIBUTION

(75) Inventors: Chi-I Kuo, Humble, TX (US); Tae Hoon Kwalk, Belle Mead, NJ (US); Dongming Li, Houston, TX (US); Porter Clarke Shannon, Seabrook, TX (US)

(73) Assignee: Univation Technologies, LLC, Houston, TX (US)

( * ) Notice: Subject to any disclaimer, the term of this patent is extended or adjusted under 35 U.S.C. 154(b) by 114 days.

(21) Appl. No.: 13/079,600

(22) Filed: Apr. 4, 2011

(65) Prior Publication Data
US 2011/0184132 A1    Jul. 28, 2011

Related U.S. Application Data

(62) Division of application No. 11/218,213, filed on Sep. 1, 2005, now abandoned.

(51) Int. Cl.
*C08F 4/653* (2006.01)
*C08F 4/6592* (2006.01)
*C08L 23/04* (2006.01)

(52) U.S. Cl.
USPC ........ 526/113; 526/114; 526/124.3; 526/129; 526/160; 526/943; 525/240

(58) Field of Classification Search
USPC .............. 526/113, 124.3, 129, 160, 943, 114; 525/240
See application file for complete search history.

(56) References Cited

U.S. PATENT DOCUMENTS

| | | |
|---|---|---|
| 4,293,673 A | 10/1981 | Hamer et al. |
| 4,302,565 A | 11/1981 | Goeke et al. |
| 4,302,566 A | 11/1981 | Karol et al. |
| 4,349,648 A | 9/1982 | Jorgensen et al. |
| 4,376,062 A | 3/1983 | Hamer et al. |
| 4,379,759 A | 4/1983 | Goeke et al. |
| 4,383,095 A | 5/1983 | Goeke et al. |
| 4,395,359 A | 7/1983 | Wagner et al. |
| 4,405,495 A | 9/1983 | Lee et al. |
| 4,427,573 A | 1/1984 | Miles et al. |
| 4,482,687 A | 11/1984 | Noshay et al. |
| 5,032,562 A | 7/1991 | Lo et al. |
| 5,290,745 A | 3/1994 | Jorgensen et al. |
| 5,539,076 A | 7/1996 | Nowlin et al. |
| 5,550,094 A | 8/1996 | Ali et al. |
| 5,693,583 A | 12/1997 | Hagerty et al. |
| 5,739,266 A | 4/1998 | Piana |
| 5,869,575 A | 2/1999 | Kolthammer et al. |
| 5,882,750 A | 3/1999 | Mink et al. |
| 6,172,173 B1 | 1/2001 | Spencer et al. |
| 6,194,520 B1 | 2/2001 | Cheruvu et al. |
| 6,403,717 B1 | 6/2002 | Adams et al. |
| 6,562,921 B1 | 5/2003 | Wenzel et al. |
| 6,583,242 B2 | 6/2003 | Wang et al. |
| 6,605,675 B2 | 8/2003 | Mawson et al. |
| 6,608,149 B2 | 8/2003 | Mawson et al. |
| 6,689,847 B2 | 2/2004 | Mawson et al. |
| 6,825,287 B2 | 11/2004 | Mawson et al. |
| 6,828,395 B1 | 12/2004 | Ehrman et al. |
| 6,846,886 B2 | 1/2005 | Mawson et al. |
| 6,878,454 B1 | 4/2005 | Shannon et al. |
| 2003/0050413 A1 | 3/2003 | Wang et al. |
| 2003/0236364 A1 | 12/2003 | McCullough et al. |
| 2005/0164875 A1 | 7/2005 | McCullough et al. |

FOREIGN PATENT DOCUMENTS

| | | |
|---|---|---|
| EP | 0043220 A1 | 6/1982 |
| EP | 0499093 A2 | 8/1992 |
| WO | WO 95/21874 | 8/1995 |
| WO | WO 00/11047 A1 | 3/2000 |
| WO | WO 03/011921 A1 | 2/2003 |
| WO | WO 03/047839 | 6/2003 |
| WO | WO 2004/007572 A1 | 1/2004 |
| WO | WO 2005/005488 | 1/2005 |
| WO | WO 2005/044866 | 5/2005 |
| WO | WO 2006/096319 A2 | 9/2006 |

OTHER PUBLICATIONS

Ineos silicas product data sheet for product ES 757, reference No. PDS 2235 (Nov. 2002).

*Primary Examiner* — Caixia Lu
(74) *Attorney, Agent, or Firm* — Jennifer A. Schmidt; Kristina Leavitt

(57) ABSTRACT

A catalyst composition that includes a support material having an improved particle-size distribution is provided. Processes for producing polyolefin composition also are provided. Polymers and films also are provided. An example of a catalyst composition is a supported multi-transition-metal catalyst composition that includes: (a) at least two catalyst components selected from the group consisting of: a nonmetallocene catalyst component and a metallocene catalyst component; (b) a support material that has a $D_{50}$ of less than about 30 microns and a particle size distribution having a $D_{90}/D_{10}$ ratio of less than about 6; and (c) an activator.

3 Claims, 1 Drawing Sheet

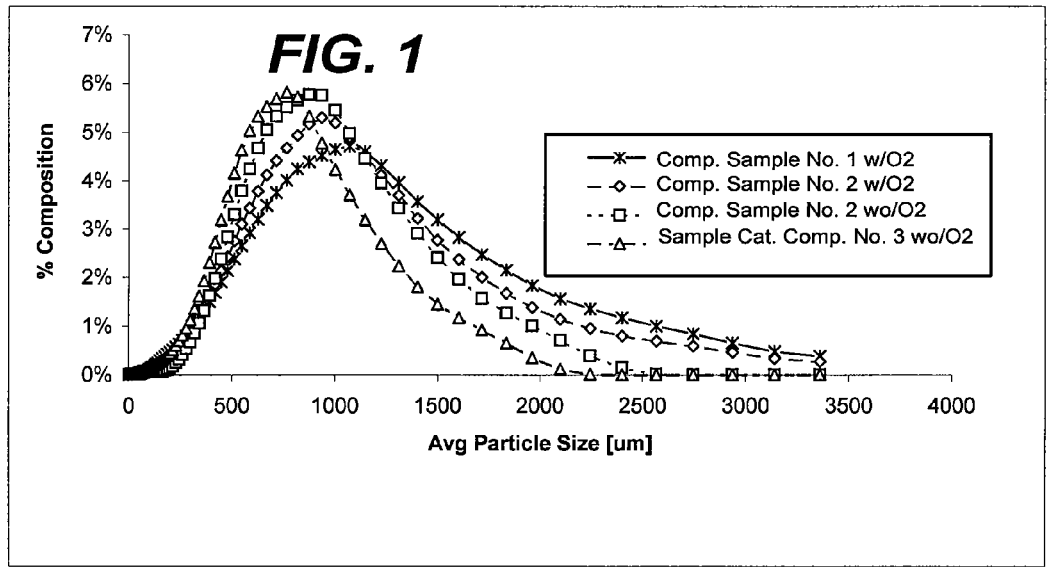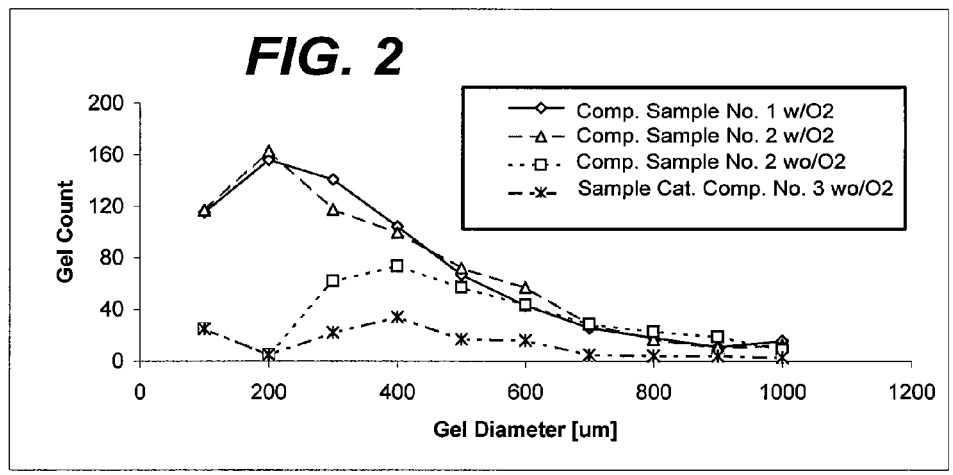

CATALYST COMPOSITIONS COMPRISING SUPPORT MATERIALS HAVING AN IMPROVED PARTICLE-SIZE DISTRIBUTION

CROSS REFERENCE TO RELATED APPLICATIONS

This application is a divisional application of Ser. No. 11/218,213, filed Sep. 1, 2005, now abandoned the disclosure of which is incorporated by reference in its entirety.

FIELD OF INVENTION

The present invention relates to catalysts for polyolefin production, and more particularly, to supported catalysts for use in making polyolefins that may be used in producing polymer products, wherein the supported catalyst comprises a support material having an improved particle-size distribution, and wherein, in a desirable embodiment, the supported catalyst is used to produce the polyolefin in a single reactor.

BACKGROUND

Advances in polymerization and catalysis have resulted in the ability to produce many new polymers having improved physical and chemical properties useful in a wide variety of superior products and applications. With the development of new catalysts, the choice of polymerization techniques (solution, slurry, high pressure or gas phase) for producing a particular polymer have been greatly expanded. Also, advances in polymerization technology have provided more efficient, highly productive and economically enhanced processes.

As with any new technology field, particularly in the polyolefins industry, a small savings in cost often determines whether a commercial endeavor is even feasible. The industry has been extremely focused on developing new and improved catalyst systems. Some have focused on designing the catalyst systems to produce new polymers, others on improving operability, and many more on improving catalyst productivity. The productivity of a catalyst usually is the key economic factor that can make or break a new commercial development in the polyolefin industry.

Multi-modal polymers produced using multiple different catalyst types—bimetallic, trimetallic, quadrimetallic catalysts, and the like—are of increasing interest, especially in producing polyethylene and other polyolefins. Improving catalyst productivity also is of concern here, as productivity should be as high as possible in order to optimize the economic efficiency of the process, given the significant cost of multiple transition metal catalysts.

Another aspect of polyolefin production pertains to the level of gels (e.g., visible imperfections) present in the polymer products. Polymer products, especially films, that are produced with a high gel concentration may have limited or no commercial value due to, inter alia, poor aesthetics, bubble stability, or continuity. Accordingly, minimizing the concentration of gels in the polymer product—especially gels of such size as to be visually perceptible—is of great importance.

SUMMARY OF THE INVENTION

An example of a process of the present invention is a process for producing a polyolefin composition comprising: contacting hydrogen and ethylene monomers with a supported multi-transition-metal catalyst composition to form a polyolefin composition; wherein the supported multi-transition-metal catalyst composition comprises: (a) at least two catalyst components selected from the group consisting of: a nonmetallocene catalyst component and a metallocene catalyst component; (b) a support material that has a $D_{50}$ of less than about 30 microns and a particle size distribution having a $D_{90}/D_{10}$ ratio of less than about 6; and (c) an activator.

An example of a catalyst composition of the present invention is a supported multi-transition-metal catalyst composition comprising: (a) at least two catalyst components selected from the group consisting of: a nonmetallocene catalyst component and a metallocene catalyst component; (b) a support material that has a $D_{50}$ of less than about 30 microns and a particle size distribution having a $D_{90}/D_{10}$ ratio of less than about 6; and (c) an activator.

An example of a polymer of the present invention is a polymer made from a process comprising: contacting hydrogen and ethylene monomers with a supported multi-transition-metal catalyst composition to form a polyolefin composition; wherein the supported multi-transition-metal catalyst composition comprises: (1) at least two catalyst components selected from the group consisting of: a nonmetallocene catalyst component and a metallocene catalyst component; (2) a support material that has a $D_{50}$ of less than about 30 microns and a particle size distribution having a $D_{90}/D_{10}$ ratio of less than about 6; and (3) an activator.

An example of a film of the present invention is a film made from a polymer that is the product of a process comprising: contacting hydrogen and ethylene monomers with a supported multi-transition-metal catalyst composition to form a polyolefin composition; wherein the supported multi-transition-metal catalyst composition comprises: (1) at least two catalyst components selected from the group consisting of: a nonmetallocene catalyst component and a metallocene catalyst component; (2) a support material that has a $D_{50}$ of less than about 30 microns and a particle size distribution having a $D_{90}/D_{10}$ ratio of less than about 6; and (3) an activator.

BRIEF DESCRIPTION OF THE DRAWINGS

FIG. 1 illustrates a graphical depiction of the particle size distributions of certain exemplary polymers, including an exemplary polymer produced in accordance with a polymerization process of the present invention, along with comparative examples.

FIG. 2 illustrates a graphical depiction of the gel count exhibited by certain exemplary polymers, including an exemplary polymer produced in accordance with a polymerization process of the present invention, along with comparative examples.

DETAILED DESCRIPTION

General Definitions

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, the phrase "supported multi-transition-metal catalyst" or "supported multi-transition-metal catalyst composition" refers to compositions that include, inter alia, two or more "catalyst components," at least one "activator," and a support material of the present invention having an improved particle size distribution. Suitable catalyst components, activators, and support materials are described further herein. The supported multi-transition-metal catalyst also may include other components (e.g., fillers), and is not limited to the activators, support materials, and the two or catalyst components. In addition to comprising a support material of the present invention having an improved particle size distribution, the supported multi-transition-metal catalysts of the present invention may include, inter alia, any number of catalyst components in any combination as described herein, as well as any activator in any combination as described herein.

As used herein, the phrase "catalyst compound" includes any compound that, once appropriately activated, is capable of catalyzing the polymerization or oligomerization of olefins, the catalyst compound comprising at least one Group 3 to Group 12 atom, and optionally at least one leaving group bound thereto.

As used herein, the phrase "leaving group" refers to one or more chemical moieties bound to the metal center of the catalyst component that can be abstracted from the catalyst component by an activator, thus producing a species active towards olefin polymerization or oligomerization. Suitable activators are described further below.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

As used herein, the term "bimodal," when used to describe a polymer or polymer composition (e.g., polyolefins such as polyethylene, or other homopolymers, copolymers or terpolymers) means "bimodal molecular weight distribution," which is understood as having the broadest definition persons in the pertinent art have given that term as reflected in printed publications and issued patents. For example, a single composition that includes polyolefins with at least one identifiable high molecular weight distribution and polyolefins with at least one identifiable low molecular weight distribution is considered to be a "bimodal" polyolefin, as that term is used herein. In a particular embodiment, other than having different molecular weights, the high molecular weight polyolefin and the low molecular weight polyolefin may be essentially the same type of polymer, for example, polyethylene. As used herein, the terms "trimodal," "quadrimodal," and "multimodal" similarly shall be understood as having the broadest definition persons in the pertinent art have given those terms as reflected in printed publications and issued patents.

As used herein, the term "productivity" means the weight of polymer produced per weight of the catalyst used in the polymerization process (e.g., grams polymer/gram catalyst).

As used herein, the term "dehydrated" is understood as having the broadest definition persons in the pertinent art have given that term in describing catalyst support materials (e.g., silica), as reflected in printed publications and issued patents, and includes any material (for example, a support particle), from which a majority of the contained/adsorbed water has been removed.

The terms "$D_{10}$," "$D_{50}$," and "$D_{90}$" will be used herein to describe the particle size distribution of a sample of a particular support material. As used herein, the term "$D_{10}$" is understood to mean that 10% of the particles in a sample of a support material have a diameter smaller than the $D_{10}$ value. The term "$D_{50}$" will be understood to mean the median particle size value. The term "$D_{90}$" will be understood to mean that 90% of the particles in the sample have a diameter smaller than the $D_{90}$ value.

As referred to herein, the term "Group 8-10 metal-containing catalyst" will be understood to refer to a catalyst compound comprising at least one metal chosen from among Groups 8-10.

As referred to herein, the term "late transition metal" will be understood to refer to a metal chosen from among Groups 8-10.

Supported Multi-Transition-Metal Catalysts of the Present Invention

According to one embodiment of the present invention, supported multi-transition-metal catalysts are provided that include, inter alia, an activator, at least two catalyst components, and a support material that has a $D_{50}$ of less than about 30 microns and a particle size distribution having a $D_{90}/D_{10}$ ratio of less than about 6. In certain embodiments, the at least two catalyst components are selected from the group consisting of a nonmetallocene catalyst component and a metallocene catalyst component—e.g., the at least two catalyst components may comprise at least two nonmetallocene catalyst components, or they may comprise at least two metallocene catalyst components, or they may comprise at least one metallocene catalyst component and at least one nonmetallocene catalyst component, and the like. Examples of suitable catalyst components, activators and support materials are set forth further below.

A variety of catalyst components may be suitable for use in the supported multi-transition-metal catalysts of the present invention, including, inter alia, metallocene catalyst components and nonmetallocene catalyst components.

The supported multi-transition-metal catalysts of the present invention may be used to produce polymer products that are multi-modal, e.g., the polymer products may be bimodal, trimodal, or quadrimodal, for example. Indeed, in certain embodiments, the supported multi-transition-metal catalyst systems of the present inventions may comprise five or more catalyst components. Thus, in certain embodiments, a higher molecular weight resin (e.g., >ca 100,000 amu) can be produced from, for example, a catalyst component that may comprise a titanium non-metallocene catalyst component. In certain embodiments, a lower molecular weight resin (e.g., <ca 100,000 amu) can be produced from, for example, a metallocene catalyst component. Accordingly, polymerization in the presence of multiple, differing catalyst components may provide a multi-modal polyolefin composition that includes components of differing molecular weight. For example, polymerization in the presence of one nonmetallocene catalyst component and one metallocene catalyst component may provide a bimodal polyolefin composition that includes a low molecular weight component and a high molecular weight component.

Certain embodiments of the present invention involve contacting monomers with nonmetallocene and/or metallocene catalyst components of the supported multi-transition-metal catalysts of the present invention. In a particular embodiment, each different catalyst component that is present in the multi-transition-metal catalyst resides, or is supported on a single type of support such that, on average, each particle of support material includes one of each nonmetallocene and/or metallocene catalyst components that are present in the multi-transition-metal catalyst. In another embodiment, each different catalyst component may be supported separately from the other catalyst components (e.g., in a bimetallic catalyst system, a metallocene catalyst component may be supported separately from a nonmetallocene catalyst component), such that on average any given particle of support material comprises only a single catalyst component. In this later embodiment, each supported catalyst may be introduced into the polymerization reactor sequentially in any order, alternately in parts, or simultaneously.

In one embodiment of the present invention, a catalyst component may be first combined with the support material, and then the supported catalyst component may be combined with another catalyst component. For example, in one embodiment, a non-metallocene catalyst component may be first combined with a support material, to provide a supported non-metallocene composition; the supported non-metallocene composition then may be combined with a metallocene catalyst component, resulting in a bimetallic catalyst composition having enhanced productivity when used in production of a bimodal polyolefin composition. Other combinations are possible as will be understood by those of ordinary skill in the art.

Various methods of affixing multiple different catalyst components (albeit differing combinations of catalyst components) to a support can be used. An example of one general procedure for preparing a supported multitransitional metal catalyst can include providing a supported nonmetallocene catalyst component, contacting a slurry that includes the nonmetallocene catalyst component in a non-polar hydrocarbon with a solution that includes a metallocene catalyst component, which also may include an activator, drying the resulting product that includes the nonmetallocene and metallocene catalyst components, and recovering a supported bimetallic catalyst composition. Other procedures for preparing supported bimetallic catalyst compositions, as well as other supported multitransitional metal catalyst compositions (e.g., those that are trimetallic, quadrimetallic, and the like) will be recognized by those of ordinary skill in the art.

Nonmetallocene Catalyst Component

In certain embodiments of the present invention, a supported, multi-transition-metal catalyst composition may be prepared that comprises one or more nonmetallocene catalyst components. As used herein, the term "non-metallocene catalyst component" refers to any catalyst component that is neither a metallocene nor one of the metallocene-type catalyst compounds identified below. A broad variety of compounds may be suitable for use as a non-metallocene catalyst component in the present invention. Examples of preferred nonmetallocene catalyst components include, inter alia, Ziegler-Natta catalysts, including but not limited to titanium- or vanadium-based Ziegler-Natta catalyst components, such as, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, preferably 1 to 6 carbon atoms. Other examples of preferred nonmetallocene catalyst components include, but are not limited to, catalyst components comprising early transitional metal Group 4 and 5 atoms, such as hafnium-, zirconium-, and niobium halides. Still other examples of preferred nonmetallocene catalyst components include, inter alia, catalyst components comprising chromium oxide or organochromium compounds, such as, for example, silica- or alumina-supported chromium oxide or $Cr(pi-allyl)_3$. As another example, a preferred nonmetallocene catalyst component may include, inter alia, alumina-supported molybdenum oxide. Other examples of preferred nonmetallocene catalyst components include, inter alia, catalyst components comprising neodymium and/or lanthanum. Additional examples of preferred nonmetallocene catalyst components include, inter alia, late-transition-metal or post-metallocene catalyst components, including those that are multidentate comprising oxygen, nitrogen, phosphorus, sulfur or silica.

As noted above, in certain embodiments, the supported multi-transition-metal catalysts of the present invention may comprise a nonmetallocene catalyst component that is a Ziegler-Natta catalyst compound. Ziegler-Natta catalyst components are well known in the art and described by, for example, ZIEGLER CATALYSTS 363-386 (G. Fink, R. Mulhaupt and H. H. Brintzinger, eds., Springer-Verlag 1995). Examples of such catalysts include those comprising $TiCl_4$ and other such transition metal oxides and chlorides. In certain embodiments, the supported multi-transition-metal catalysts of the present invention may comprise a nonmetallocene catalyst component that is a Ziegler-Natta catalyst component that comprises a nonmetallocene transition metal compound selected from the group consisting of Group 4 and Group 5 halides, oxides, oxyhalides, alkoxides, and mixtures thereof.

In embodiments of the present invention wherein one or more nonmetallocene catalyst components are used, a nonmetallocene catalyst component may be combined with a support material of the present invention in one embodiment, either with or without another catalyst component (e.g., a metallocene catalyst component, or the same or different nonmetallocene catalyst component). The nonmetallocene catalyst component can be combined with, placed on, or otherwise affixed to a support material of the present invention in a variety of ways. In one of those ways, a slurry of the support material in a suitable non-polar hydrocarbon diluent may be contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$-$C_{12}$ alkyl groups, or $C_4$-$C_{10}$ alkyl groups, or $C_4$-$C_8$ alkyl groups. In at least one specific embodiment, the organomagnesium compound is dibutyl magnesium.

In one embodiment, the amount of organomagnesium compound included in the silica slurry is only that which will be deposited, physically or chemically, onto the support material of the present invention, for example, being bound to the hydroxyl groups on the support material, and no more than that amount, since any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support material, in which case any undeposited excess amount can be removed by filtration and washing. The amount of organomagnesium compound (moles) based on the amount of dehydrated silica (grams) generally range from 0.2 mmol/gram to 2 mmol/gram in one embodiment.

Optionally, the organomagnesium compound-treated slurry may be contacted with an electron donor, such as tetraethylorthosiloxane (TEOS) or an organic alcohol R"OH, where R" is a $C_1$-$C_{12}$ alkyl group, or a $C_1$ to $C_8$ alkyl group, or a $C_2$ to $C_4$ alkyl group. In a particular embodiment, R"OH may be n-butanol. The amount of organic alcohol used may be an amount effective to provide an R"OH:Mg mol/mol ratio of from 0.2 to 1.5, or from 0.4 to 1.2, or from 0.6 to 1.1, or from 0.9 to 1.1.

The slurry (which, as noted, optionally may be organomagnesium-treated and/or alcohol-treated) may be contacted with a non-metallocene transition metal compound. The amount of non-metallocene transition metal compound used is sufficient to give a transition metal to magnesium mol/mol ratio of from 0.3 to 1.5, or from 0.5 to 0.8. The diluent can then be removed in a conventional manner, such as by evaporation or filtering, to obtain the dry, supported nonmetallocene catalyst component.

In embodiments in which one or more nonmetallocene catalyst components are used (e.g., in conjunction with other nonmetallocene catalyst components and/or with one or more metallocene catalyst components), the catalyst components may be contacted with the support material of the present invention in any order. In a particular embodiment of the invention, a nonmetallocene catalyst component is reacted first with the support material of the present invention as described above, followed by contacting this supported nonmetallocene catalyst component with a metallocene catalyst component.

Metallocene Catalyst Component

In certain embodiments of the present invention, a supported, multi-transition-metal catalyst may be prepared that comprises one or more nonmetallocene catalyst components. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlalky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. They also include constrained-geometry catalyst compounds, including metal atoms from Groups 3, 4, 5, and 6B. Hereinafter, these compounds will be referred to as "metallocenes" or "metallocene catalyst components". Where included, a metallocene catalyst component may be supported on a support material of the present invention in a particular embodiment as described further below, and may be supported with or without one or more nonmetallocene catalyst components (with one or more nonmetallocene catalyst components, in a particular embodiment).

The Cp ligands are typically R-bonded and/or fused ring(s) or ring systems. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) may be selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof. In a particular embodiment, the metallocenes useful in the present invention may be selected from those including one or two (two, in a more particular embodiment), of the same or different Cp rings selected from the group consisting of cyclopentadienyl, indenyl, fluorenyl, tetrahydroindenyl, and substituted versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and from Ti, Zr, Hf atoms in yet a more particular embodiment, and may be Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound to the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I):

$$Cp^A Cp^B MX_n \qquad (I)$$

wherein M is as described above; each X is chemically bonded to M; each Cp group is chemically bonded to M; and n is an integer from 0 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R.

In one embodiment, $Cp^A$ and $Cp^B$ are independently selected from the group consisting of the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in formula (I) as well as ring substituents in formulas (Va-d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) through (V) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically-unsaturated substituents including vinyl-terminated ligands, for example 3-butenyl, 2-propenyl, 5-hexenyl and the like. In one embodiment, at least two R groups (two adjacent R groups in one embodiment) are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Non-limiting examples of X groups include alkyls, amines, phosphines, ethers, carboxylates, dienes, hydrocarbon radicals having from 1 to 20 carbon atoms; fluorinated hydrocarbon radicals (e.g., $-C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis (N-methylanilide), dimethylamide, dimethylphosphide radicals and the like. In one embodiment, two or more X's form a part of a fused ring or ring system. In certain embodiments, X may be selected from the group consisting of $C_1$ to $C_6$ alkyls, $C_6$ aryls, $C_7$ to $C_{12}$ alkylaryls, fluorinated $C_1$ to $C_6$ alkyls, fluorinated $C_6$ aryls, fluorinated $C_7$ to $C_{12}$ alkylaryls, chlorine and fluorine.

In another aspect of the invention, the metallocene catalyst component includes those of formula (I) where $Cp^A$ and $Cp^B$ are bridged to each other by at least one bridging group, (A), such that the structure is represented by formula (II):

$$Cp^A(A)Cp^BMX_n \quad \text{(II)}$$

These bridged compounds represented by formula (II) are known as "bridged metallocenes". $Cp^A$, $Cp^B$, M, X and n in formula (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as, but not limited to, at least one of a carbon, oxygen, nitrogen, silicon, aluminum, boron, germanium and tin atom and combinations thereof; wherein the heteroatom also may be $C_1$ to $C_{12}$ alkyl or aryl substituted to satisfy neutral valency. The bridging group (A) also may contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)-$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methylethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) also may be cyclic, comprising, for example 4 to 10 ring members (5 to 7 ring members in a more particular embodiment). The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O (in particular, Si and Ge). The bonding arrangement between the ring and the Cp groups may be either cis-, trans-, or a combination.

The cyclic bridging groups (A) may be saturated or unsaturated and/or may carry one or more substituents and/or may be fused to one or more other ring structures. If present, the one or more substituents are selected from the group consisting of hydrocarbyl (e.g., alkyl such as methyl) and halogen (e.g., F, Cl) in one embodiment. The one or more Cp groups to which the above cyclic bridging moieties may optionally be fused may be saturated or unsaturated, and may be selected from the group consisting of those having 4 to 10 (more particularly 5, 6 or 7) ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) may be different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene represented by the formula (III):

$$Cp^A(A)QMX_n \quad \text{(III)}$$

wherein $Cp^A$ is defined above and is bound to M; (A) is a bridging group bonded to Q and $Cp^A$; and wherein an atom from the Q group is bonded to M; and n is an integer 0, 1 or 2. In formula (III) above, $Cp^A$, (A) and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene, and other compounds comprising Group 15 and Group 16 atoms capable of bonding with M.

In yet another aspect of the invention, the at least one metallocene catalyst component may be an unbridged "half sandwich" metallocene represented by the formula (IVa):

$$Cp^A MQ_q X_n \quad \text{(IVa)}$$

wherein $Cp^A$ is defined as for the Cp groups in (I) and is a ligand that is bonded to M; each Q is independently bonded to M; X is a leaving group as described above in (I); n ranges from 0 to 3, and is 0 or 3 in one embodiment; q ranges from 0 to 3, and is 0 or 3 in one embodiment. In one embodiment, $Cp^A$ is selected from the group consisting of cyclopentadienyl, indenyl, tetrahydroindenyl, fluorenyl, substituted version thereof, and combinations thereof.

In formula (IVa), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ alkyls, and $C_2$ to $C_{20}$ heteroallyl moieties.

Described another way, the "half sandwich" metallocenes above can be described as in formula (IVb), such as described in, for example, U.S. Pat. No. 6,069,213:

$$Cp^A M(Q_2 GZ)X_n \text{ or}$$

$$T(Cp^A M(Q_2 GZ)X_n)_m \quad \text{(IVb)}$$

wherein:

M, $Cp^A$, X and n are as defined above;

$Q_2 GZ$ forms a polydentate ligand unit (e.g., pivalate), wherein at least one of the Q groups form a bond with M, and is defined such that each Q is independently selected from the group consisting of $-O-$, $-NR-$, $-CR_2-$ and $-S-$; G is either carbon or silicon; and Z is selected from the group consisting of R, $-OR$, $-NR_2$, $-CR_3$, $-SR$, $-SiR_3$, $-PR_2$, and hydride, providing that when Q is $-NR-$, then Z is selected from the group consisting of $-OR$, $-NR_2$, $-SR$, $-SiR_3$, $-PR_2$; and provided that neutral valency for Q is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in a particular embodiment; and

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^A M(Q_2 GZ)X_n$" groups, and is chemically bonded to the $Cp^A$ groups.

m is an integer from 1 to 7; m is an integer from 2 to 6 in a more particular embodiment.

In another aspect of the invention, the at least one metallocene catalyst component can be described more particularly in formulae (Va), (Vb), (Vc) and (Vd):

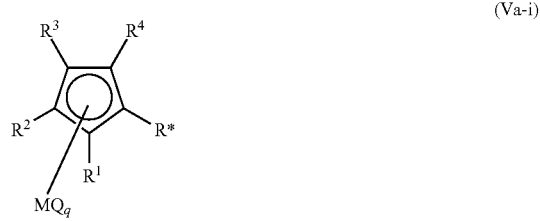

(Va-i)

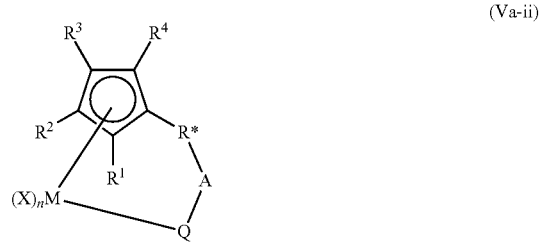

(Va-ii)

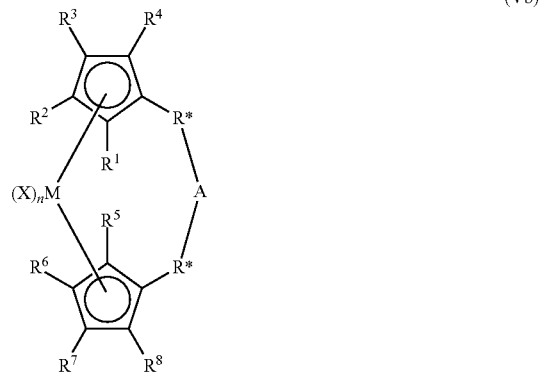

(Vb)

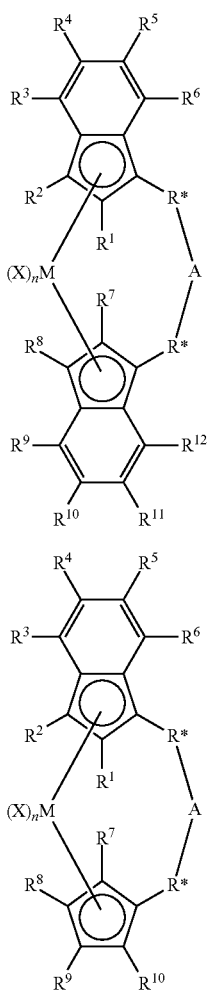

(Vc)

(Vd)

wherein in formulae (Va) to (Vd) M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (Va-i) and (Va-ii) is selected from the group consisting of halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates;

q is an integer ranging from 1 to 3;

wherein each R* is independently: selected from the group consisting of hydrocarbyls and heteroatom-containing hydrocarbyls in one embodiment; and selected from the group consisting of alkylenes, substituted alkylenes and heteroatom-containing hydrocarbyls in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbons in a more particular embodiment; and selected from the group consisting of $C_1$ to $C_4$ alkylenes in yet a more particular embodiment; and wherein both R* groups are identical in another embodiment in formulae (Vb-d);

A is as described above for (A) in formulae (II), and more particularly, selected from the group consisting of —O—, —S—, $SO_2$—, —NR—, $=SiR_2$, $=GeR_2$, $=SnR_2$, —$R_2SiSiR_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —$CH_2CH_2$—, $=CR_2$ and $=SiR_2$ in a more particular embodiment; wherein R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment;

wherein A may be absent in yet another embodiment, in which case each R* is defined as for $R^1$-$R^{12}$;

each X is as described above in (I);

n is an integer from 0 to 4, and from 1 to 3 in another embodiment, and 1 or 2 in yet another embodiment; and $R^1$ through $R^{12}$ are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylphenyl groups in yet a more particular embodiment; wherein adjacent R groups may form a ring, either saturated, partially saturated, or completely saturated.

The structure of the metallocene catalyst component represented by (Va) may take on many forms such as disclosed in, for example, U.S. Pat. Nos. 5,703,187, and 5,747,406, including a dimer or oligomeric structure, such as disclosed in, for example, U.S. Pat. Nos. 5,026,798 and 6,069,213.

In a particular embodiment of the metallocene represented in (Vd), $R^1$ and $R^2$ form a conjugated 6-membered carbon ring system that may, or may not, be substituted.

Non-limiting examples of metallocene catalyst components consistent with the description herein include:

cyclopentadienylzirconium $X_n$,
indenylzirconium $X_n$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$, tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$,
dimethylsilyl(1,2,3,4-tetramethylcyclopentadienyl)(1,2,3-trimethylcyclopentadienyl)zirconium $X_n$,
dimethylsilyl(1,2,3,4-tetramethylcyclopentadienyl)(1,2-dimethyl-cyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$,
dimethylsilyl(2-methylindenyl)(fluorenyl)zirconium $X_n$,
diphenylsilyl(1,2,3,4-tetramethyl-cyclopentadienyl)(3-propylcyclopentadienyl) zirconium $X_n$,
dimethylsilyl(1,2,3,4-tetramethylcyclopentadienyl)(34-butylcyclopentadienyl) zirconium $X_n$,
dimethylgermyl(1,2-dimethylcyclopentadienyl)(3-isopropylcyclopentadienyl) zirconium $X_n$,
dimethylsilyl(1,2,3,4-tetramethyl-cyclopentadienyl)(3-methylcyclopentadienyl) zirconium $X_n$,
diphenylmethylidene(cyclopentadienyl)(9-fluorenyl)zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl)zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl)zirconium $X_n$,
ethylenebis(2-propyl-4,5,6,7-tetrahydro-1-indenyl)zirconium $X_n$,
ethylenebis(2-isopropyl-4,5,6,7-tetrahydro-1-indenyl)zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl)zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl)(cyclopentadienyl)zirconium $X_n$,
cyclotetramethylenesilyl(tetramethylcyclopentadienyl)(cyclopentadienyl)zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl) zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl) zirconium $X_n$,
cyclotrimethylenesilylbis(tetramethylcyclopentadienyl)zirconium $X_n$,
dimethylsilyl(tetramethylcyclopentadienyl)(N-tert-butylamido)titanium $X_n$, bis(cyclopentadienyl)chromium $X_n$,
bis(cyclopentadienyl)zirconium $X_n$,
bis(n-butylcyclopentadienyl)zirconium $X_n$,
bis(n-dodecycicyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis (1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis (1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium cyclopentadienylindenylzirconium $X_n$,
bis(n-propylcyclopentadienyl)hafnium bis(n-butylcyclopentadienyl)hafnium $X_n$,
bis(n-pentylcyclopentadienyl)hafnium (n-propyl cyclopentadienyl)(n-butyl cyclopentadienyl)hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium  bis(2-n-butylindenyl) hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl)(cyclopropylamido)titanium $X_n$,
dimethylsilyl(tetramethyleyclopentadienyl)(cyclobutylamido)titanium $X_n$,
dimethylsilyl(tetramethyleyclopentadienyl)(cyclopentylamido)titanium $X_n$,
dimethylsilyl(tetramethylcyclopentadienyl)(cyclohexylamido)titanium $X_n$,
dimethylsilyl(tetramethylcyclopentadienyl)(cycloheptylamido)titanium $X_n$, dimethylsilyl(tetramethylcyclopentadienyl)(cyclooctylamido)titanium $X_n$,
dimethylsilyl(tetramethylcyclopentadienyl)(cyclononylamido)titanium $X_n$,
dimethylsilyl(tetramethylcyclopentadienyl)(cyclodecylamido)titanium $X_n$,
dimethylsilyl(tetramethylcyclopentadienyl)(cycloundecylamido)titanium $X_n$,
dimethylsilyl(tetramethylcyclopentadienyl)(cyclododecylamido)titanium $X_n$,
dimethylsilyl(tetramethylcyclopentadienyl)(sec-butylamido)titanium $X_n$,
dimethylsilyl(tetramethylcyclopentadienyl)(n-octylamido)titanium $X_n$,
dimethylsilyl(tetramethylcyclopentadienyl)(n-decylamido)titanium $X_n$,
dimethylsilyl(tetramethylcyclopentadienyl)(n-octadecylamido)titanium $X_n$,
methylphenylsilyl(tetramethylcyclopentadienyl)(cyclopropylamido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylamido)titanium $X_n$,
methylphenylsilyl(tetramethylcyclopentadienyl)(cycloundecylamido)titanium $X_n$,
methylphenylsilyl(tetramethylcyclopentadienyl)(cyclododecylamido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethyleyclopentadienyl)(n-octylamido)titanium $X_n$,
diphenylsilyl(tetramethyleyclopentadienyl)(n-decylamido)titanium $X_n$,
diphenylsilyl(tetramethylcyclopentadienyl)(n-octadecylamido)titanium $X_n$, and derivatives thereof,
wherein the value of n is 1, 2 or 3. By "derivatives thereof", it is meant any substitution or ring formation as described above for formulae (Va-d) in one embodiment; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine, chlorine, or bromine.

It is contemplated that the metallocene catalyst components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

A "metallocene catalyst component" useful in the present invention may comprise any combination of any "embodiment" described herein.

Support Materials of the Present Invention Having a Improved Particle Size Distribution The multi-transition-metal catalysts of the present invention further comprise a support material of the present invention having an improved particle size distribution. Supports, methods of supporting, modifying, and activating supports for single-site catalysts such as metallocenes are discussed in, for example, 1 METALLOCENE-BASED POLYOLEFINS 173-218 (J. Scheirs & W. Kaminsky eds., John Wiley & Sons, Ltd. 2000). The terms "support" or "carrier", as used herein, are used interchangeably and refer to the support materials of the present invention.

The support materials of the present invention, having an improved, particle size distribution, generally have a $D_{90}/D_{10}$ ratio of less than about 6. In certain embodiments, the support materials of the present invention have a $D_{90}/D_{10}$ ratio of less than about 5, and in certain embodiments, less than about 4.5. In certain embodiments, the support materials of the present invention has a $D_{90}$ of less than about 60 microns, and in certain embodiments a $D_{90}$ of less than about 55 microns, and in certain embodiments a $D_{90}$ of less than about 50 microns, and in certain embodiments a $D_{90}$ of less than about 45 microns. In certain embodiments, the support materials of the present invention have a $D_{50}$ of less than about 30 microns, and in certain embodiments a $D_{50}$ of less than about 25 microns. In certain embodiments, the support materials of the present invention have a $D_{10}$ of less than about 5 microns, and in certain embodiments a $D_{10}$ of less than about 8 microns, and in certain embodiments a $D_{10}$ of less than about 10 microns. In certain preferred embodiments, the support materials of the present invention have a $D_{50}$ of less than about 30 and a particle size distribution having a $D_{90}/D_{10}$ ratio of less than about 6.

The $D_{10}$, $D_{50}$, and $D_{90}$ values for a sample support material may be calculated with the use of a conventional, commercially-available particle size analyzer. An example of a suitable particle size analyzer is commercially available from Malvern Instruments, Ltd., of Worcestershire, UK, under the trade name Mastersizer S long bench. An example of suitable software that may be used with the aforementioned particle size analyzer is commercially available from Malvern and referred to as Mastersizer Series Software Version 2.19. The use of a Malvern particle size analyzer to generate $D_{10}$, $D_{50}$, and $D_{90}$ values for a particular sample is described in a Malvern manual titled "Getting Started, MAN 0101, Issue 1.3 (August 1997)," particularly at page 7.6, the disclosure of which is hereby incorporated by reference.

Non-limiting examples of materials that may be suitable for use as the support materials of the present invention having improved particle size distributions include inorganic oxides and inorganic chlorides, and in particular such materials as talc, clay, silica, alumina, magnesia, zirconia, iron oxides, boria, calcium oxide, zinc oxide, barium oxide, titanium dioxide, aluminum phosphate gel, glass beads, and polymers such as polyvinylchloride and substituted polystyrene, functionalized or crosslinked organic supports such as polystyrene divinyl benzene polyolefins or polymeric compounds, and mixtures thereof, and graphite, in any of its various forms. In a preferred embodiment, the support materials of the present invention comprise silica. In a particularly preferred embodiment, the support materials of the present invention comprise a synthetic amorphous silicon dioxide having a pore volume ranging from 1.5 to 2.0 cm$^3$/g and a surface area of from 280 to 350 m$^2$/g, with a $D_{90}$ of about 44 micron, a $D_{50}$ of about 25 micron, and a $D_{10}$ of about 10 micron, commercially available from Ineos, under the trade name ES-757.

The use of the support materials of the present invention, having an improved particle size distribution, in the supported, multitransition metal catalysts of the present invention is believed to provide a number of benefits, including, inter alia, enhancing the productivity of the multitransition metal catalyst in polymerization processes that produce polymer products such as polyolefins. Moreover, the use of the supports of the present invention in the catalysts of the present invention also is believed to favorably impact the film appearance rating and gel count of such polymer products. Though not wishing to be limited by theory, it is believed that the improved particle size distribution of the supports of the present invention may improve the absorption of activators (e.g., trimethylaluminum, and the like) onto the multitransition metal catalyst, particularly as such absorption is thought to be surface-area-dependent. Additionally, because the catalysts of the present invention comprise multiple transition metal catalyst components, the improved particle size distribution of the supports of the present invention may improve the distribution of each component (e.g., one or more metallocene catalyst components and one or more nonmetallocene catalyst components) on the catalyst.

A support of the present invention may be contacted with the other components of the catalyst system in any number of ways. In one embodiment, the support material of the present invention is contacted with the activator to form an association between the activator and the support material, e.g., a "bound activator". In another embodiment, the catalyst component may be contacted with the support material of the present invention to form a "bound catalyst component". In yet another embodiment, the support material of the present invention may be contacted with the activator and catalyst component together, or with each partially in any order. The components may be contacted by any suitable means as in a solution, slurry, or solid form, or some combination thereof, and may be heated to any desirable temperature to effectuate a desirable chemical/physical transformation.

In certain embodiments of the present invention, the support material of the present invention, especially an inorganic support or graphite support, may be pretreated such as by a halogenation process or other suitable process that, for example, associates a chemical species with the support material either through chemical bonding, ionic interactions, or other physical or chemical interaction. It is within the scope of the present invention to co-contact (or "co-immobilize") more than one catalyst component with a support material of the present invention. Non-limiting examples of co-immobilization of catalyst components include two or more of the same or different metallocene catalyst components, one or more metallocenes with a Ziegler-Natta type catalyst, one or more metallocenes with a chromium or "Phillips" type catalyst, one or more metallocenes with a Group 8-10 metal-containing catalyst, and any of these combinations with one or more activators. More particularly, co-supported combinations include metallocene A/metallocene A; metallocene A/metallocene B; metallocene/Ziegler Natta; metallocene/Group 8-10 metal-containing catalyst; metallocene/chromium catalyst; metallocene/Ziegler Natta/Group 8-10-containing catalyst; metallocene/chromium catalyst/Group 8-10-containing catalyst, any of the these with an activator, and combinations thereof.

In certain embodiments of the present invention, the support materials of the present invention having an improved particle size distribution may be dehydrated prior to use in the multitransition metal catalysts of the present invention. An example of a procedure for dehydrating silica at 600° C. is set forth in U.S. Pat. No. 5,525,678.

The support materials of the present invention may be combined with a non-polar hydrocarbon diluent to form a support slurry, which can be stirred and optionally heated during mixing.

A variety of non-polar hydrocarbon diluents can be used to form the support slurry, but any non-polar hydrocarbon selected preferably remains in liquid form at all relevant reaction temperatures, and the ingredients used to form a nonmetallocene catalyst component is preferably at least partially soluble in the non-polar hydrocarbon. Accordingly, a non-polar hydrocarbon diluent is considered to be a "solvent" herein, even though in certain embodiments the ingredients are only partially soluble in the hydrocarbon.

Examples of suitable non-polar hydrocarbons include $C_4$-$C_{10}$ linear or branched alkanes, cycloalkanes and aromatics. More specifically, a non-polar alkane can be isopentane, hexane, isohexane, n-heptane, octane, nonane, or decane; a non-polar cycloalkane such as cyclohexane; or an aromatic such as benzene, toluene, or ethylbenzene. Mixtures of different non-polar hydrocarbons can also be used.

The support slurry can be heated both during and after mixing of the support particles with a non-polar hydrocarbon solvent, but at the point when catalyst components are combined with the support slurry, the temperature of the slurry is preferably sufficiently low so that none of the catalysts are inadvertently deactivated. Thus, the temperature of the support slurry (e.g., silica slurry) is preferably maintained at a temperature below 90° C., for example, from 25 to 70° C., or from 40 to 60° C. in another embodiment.

Activator

As used herein, the term "activator" is defined to be any compound or combination of compounds, supported or unsupported, which can activate a catalyst compound (e.g., Ziegler-Natta, metallocenes, Group 8-10-containing catalysts, etc.), such as by creating a cationic species from the catalyst component. Typically, this involves the abstraction of at least one leaving group (X group in the formulas above) from the metal center of the catalyst component. The catalyst components of the present invention are thus activated towards olefin polymerization using such activators. Embodiments of such activators include Lewis acids such as cyclic or oligomeric poly(hydrocarbylaluminum oxides), alkylaluminum compounds and so called non-coordinating ionic activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri (n-butyl)ammonium tetrakis(pentafluorophenyl)boron and/or a trisperfluorophenyl boron metalloid precursors to activate desirable metallocenes described herein. MAO and other aluminum-based activators are well known in the art. Ionizing activators are well known in the art. The activators may be associated with or bound to a support material of the present invention, either in association with the catalyst component (e.g., metallocene) or separate from the catalyst component, such as described by Gregory G. Hlalky, *Heterogeneous Single-Site Catalysts for Olefin Polymerization* 100(4) CHEMICAL REVIEWS 1347-1374 (2000).

Non-limiting examples of aluminum alkyl compounds that may be utilized as activators for catalyst precursor compounds that may be used in the methods of the present invention include trimethylaluminum, triethylaluminum, triisobutylaluminum, tri-n-hexylaluminum, tri-n-octylaluminum and the like.

Examples of neutral ionizing activators include Group 13 tri-substituted compounds, in particular, tri-substituted boron, thallium, aluminum, gallium and indium compounds, and mixtures thereof. The three substituent groups are each independently selected from the group consisting of alkyls, alkenyls, halogen, substituted alkyls, aryls, arylhalides, alkoxy and halides. In one embodiment, the three groups are independently selected from the group consisting of halogen, mono or multicyclic (including halosubstituted) aryls, alkyls, and alkenyl compounds and mixtures thereof. In another embodiment, the three groups are selected from the group consisting of alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group consisting of alkyls having 1 to 4 carbon groups, phenyl, naphthyl and mixtures thereof. In yet another embodiment, the three groups are selected from the group consisting of highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from the group consisting of fluorine, chlorine and bromine.

In another embodiment, the neutral tri-substituted Group 13 compounds are boron compounds. Other suitable neutral ionizing activators are described in U.S. Pat. No. 6,399,532 B1, U.S. Pat. No. 6,268,445 B1, and in 19 ORGANOMETALLICS 3332-3337 (2000), and in 17 ORGANOMETALLICS 3996-4003 (1998).

Illustrative, non-limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(phenyl)boron and the like; and triaryl phosphonium salts such as triphenylphosphonium tetra(phenyl)boron, tri(methylphenyl)phosphonium tetra(phenyl)boron, tri(dimethylphenyl)phosphonium tetra(phenyl)boron and the like, and their aluminum equivalents.

In yet another embodiment, an activator may be used that comprises an alkylaluminum in conjunction with a heterocyclic compound. The ring of the heterocyclic compound may include at least one nitrogen, oxygen, and/or sulfur atom, and may include at least one nitrogen atom in one embodiment. The heterocyclic compound may include 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituent groups also may be substituted with halogens, particularly fluorine or bromine, or heteroatoms or the like. Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine.

Non-limiting examples of heterocyclic compounds that may be suitable as activators include substituted and unsubstituted pyrroles, imidazoles, pyrazoles, pyrrolines, pyrrolidines, purines, carbazoles, and indoles, phenyl indoles, 2,5-dimethylpyrroles, pentafluorophenylpyrrole, 4,5,6,7-tetrafluoroindole or 3,4-difluoropyrroles.

In one embodiment, the heterocyclic compound described above is combined with an alkyl aluminum or an alumoxane to yield an activator compound which, upon reaction with a catalyst component (e.g., a metallocene), produces an active polymerization catalyst. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators that may be suitable include those described in WO 98/07515 such as tris (2,2',2"-nonafluorobiphenyl) fluoroaluminate. The present invention further contemplates the use of combinations of activators, such as, for example, alumoxanes and ionizing activators in combinations. Other suitable activators include aluminum/boron complexes, perchlorates, periodates and iodates including their hydrates; lithium (2,2'-bisphenyl-ditrimethylsilicate).4THF; silylium salts in combination with a non-coordinating compatible anion. Also, methods of activation such as using radiation, electro-chemical oxidation, and the like also are contemplated as activating methods for the purposes of rendering a neutral metallocene-type catalyst compound or precursor to a metallocene-type cation capable of polymerizing olefins. Other activators or methods for activating a metallocene-type catalyst compound are described in, for example, U.S. Pat. Nos. 5,849,852, 5,859,653 and 5,869,723 and WO 98/32775.

In general, the activator and catalyst component(s) are combined in mole ratios of activator to catalyst component(s) from 1000:1 to 0.1:1 in one embodiment, and from 300:1 to 1:1 in a more particular embodiment, and from 150:1 to 1:1 in yet a more particular embodiment, and from 50:1 to 1:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component(s) ranges from 2:1 to 100,000:1 in one embodiment, and from 10:1 to 10,000:1 in another embodiment, and from 50:1 to 2,000:1 in a more particular embodiment. When the activator is a neutral or ionic ionizing activator such as a boron alkyl and the ionic salt of a boron alkyl, the mole ratio of activator to catalyst component(s) ranges from 0.5:1 to 10:1 in one embodiment, and from 1:1 to 5:1 in yet a more particular embodiment.

Gas Phase Polymerization Process

The supported, multi-transition-metal catalysts of the present invention are used to make polyolefin compositions. In certain embodiments of the present invention that use supported bimetallic catalyst compositions, these catalyst compositions may be used to make bimodal polyolefin compositions, e.g., compositions having a bimodal molecular weight distribution; in a particular embodiment, bimetallic catalysts described herein may be used in a single polymerization reactor to make a bimodal polyolefin composition. Once a supported multi-transition-metal catalyst of the present invention is prepared, as described above, a variety of processes can be carried out using that composition. Among the varying approaches that can be used include procedures set forth in U.S. Pat. No. 5,525,678 in which those processes are modified in accordance with the inventions claimed herein. The equipment, process conditions, reactants, additives and other materials of course will vary in a given process, depending on the desired composition and properties of the polymer being formed.

More particularly, in one embodiment, the processes of the present invention comprise a gas phase polymerization process of one or more olefin monomers having from 2 to 30 carbon atoms, from 2 to 10 carbon atoms in a more particular embodiment, and from 2 to 6 carbon atoms in yet a more particular embodiment. The invention is particularly well suited to the polymerization of two or more olefin monomers of ethylene, propylene, 1-butene, 1-pentene, 1-hexene, 1-heptene, 1-octene, 4-methyl-1-pentene, 1-isobutene, isobutylene and 3-methyl-1-butene.

Other monomers useful in the processes of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isoprene, vinylbenzocyclobutane, styrenes, alkyl substituted styrene, ethylidene norbornene, dicyclopentadiene and cyclopentene.

In a preferred embodiment of the processes of the present invention, a copolymer of ethylene is produced, where with invention, ethylene, a comonomer (having at least one $\alpha$-olefin having from 4 to 15 carbon atoms, from 4 to 12 carbon atoms in yet a more particular embodiment, and from 4 to 8 carbon atoms in yet a more particular embodiment), is polymerized in a gas phase process. In another embodiment of the processes of the invention, ethylene may be polymerized with at least two different comonomers, optionally one of which may be a diene, to form a terpolymer. In another embodiment of the processes of the invention, hydrogen and ethylene monomers may be polymerized.

Typically, in a gas phase polymerization process, a continuous cycle is employed where in one part of the cycle of a reactor system, a cycling gas stream (otherwise known as a recycle stream or fluidizing medium) is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed, cooled, and recycled back into the reactor as a gas or as a mixture of gas and liquid. Simultaneously, polymer product is withdrawn from the reactor and fresh monomer is added to replace the polymerized monomer.

Optionally, a condensable inert component may be added to increase the capability of removing heat from the reactor. In certain embodiments, suitable condensable inert components may comprise saturated hydrocarbons having from about 4 to about 7 carbon atoms.

The reactor pressure in a gas phase process may vary from 100 psig (690 kPa) to 500 psig (3448 kPa) in one embodiment, from 200 psig (1379 kPa) to 400 psig (2759 kPa) in a more particular embodiment, and from 250 psig (1724 kPa) to 350 psig (2414 kPa) in yet a more particular embodiment.

The reactor temperature in a gas phase process may vary from 30° C. to 120° C. in one embodiment, from 60° C. to 115° C. in a more particular embodiment, from 70° C. to 110° C. in yet a more particular embodiment, and from 85° C. to 100° C. in yet a more particular embodiment, or as set out further below.

In an embodiment of the invention, the process may be operated by introducing a carboxylate metal salt such as aluminum stearate or other metal-fatty acid compound into the reactor and/or contacting a carboxylate metal salt with a supported, multi-transition-metal catalyst of the present invention prior to its introduction into the reactor.

In certain embodiments of the present invention, the multi-transition-metal catalysts of the present invention may be activated by any suitable means known in the art, either before introduction into the polymerization reactor or in situ. The catalyst system is fed to the reactor in a dry (no diluent) state in a particular embodiment. In another embodiment, the catalyst system is suspended in a diluent (e.g., $C_3$ to $C_{15}$ hydrocarbon) comprising from 0.01 wt % to 100 wt % mineral oil or silicon oil and fed into the reactor.

The gas-phase process of the present invention includes contacting the multi-transition-metal catalysts of the present invention (including support material of the present invention having an improved particle size distribution, catalyst components, and activators) with monomers in a reactor vessel of desirable configuration to form a polyolefin. In one embodiment, the contacting may take place in a first reactor vessel, followed by transfer of the formed polymer into another second, third, etc. reactor vessel to allow further polymerization, optionally by adding the same or different monomers and optionally by adding the same or different catalyst components, activators, etc. In a particular embodiment of the present invention, the supported, multi-transition-metal catalyst of the present invention is contacted with monomers in a single reactor vessel (or "reactor"), followed by isolation of a finished polyolefin resin.

To effectuate the polymerization processes of the present invention, the composition of the recycling gas stream is measured with a gas chromatograph. The partial pressure of ethylene is controlled at a value in the range of from about 100 psia (690 kpaa) to about 250 psia (1720 kpaa). In certain embodiments of the present invention, the mole ratio of hydrogen to ethylene may be in the range of from about 0.007 to about 0.016.

An alkylaluminum compound, or mixture of compounds, such as trimethylaluminum or triethylaluminum may be fed into the reactor in one embodiment at a rate of from 10 wt. ppm to 500 wt. ppm (weight parts per million alkylaluminum feed rate compared to ethylene feed rate), and from 50 wt. ppm to 400 wt. ppm in a more particular embodiment, and from 60 wt. ppm to 300 wt. ppm in yet a more particular embodiment, and from 80 wt. ppm to 250 wt. ppm in yet a more particular embodiment, and from 75 wt. ppm to 150 wt. ppm in yet another embodiment, wherein a desirable range may comprise any combination of any upper limit with any lower limit. The alkylaluminum can be represented by the general formula $AlR_3$, wherein each R is the same or different and independently selected from $C_1$ to $C_{10}$ alkyls.

Also, water also may be fed into the reactor in another embodiment at a rate of from 0.01 wt. ppm to 200 wt. ppm (weight parts per million water feed rate compared to ethylene feed rate), and from 0.1 wt. ppm to 150 wt. ppm in another embodiment, and from 0.5 wt. ppm to 100 wt. ppm in yet another embodiment, and from 1 wt. ppm to 60 wt. ppm in yet another embodiment, and from 5 wt. ppm to 40 wt. ppm in yet a more particular embodiment, wherein a desirable range may comprise any combination of any upper limit with any lower limit described herein.

Optionally, oxygen may be fed into the recycling gas system. In certain embodiments, oxygen optionally may be fed into the recycling gas system at a rate in the amount of from about 0.01 to about 1.0 weight ppm compared to the ethylene feed rate. The oxygen may serve as an antifoulant, and may reduce or eliminate fouling of, for example, the recycling gas cooler or fluidized bed distributor plate. Optionally, other compounds may be employed as optional antifoulants.

Bimodal Polymer Product and Films Made Therefrom

The polymers produced by the processes described herein, utilizing the supported, multitransition metal catalysts of the present invention described herein, can be used in a wide variety of products and end-use applications such as films, pipes and tubing, wire coating, and other applications. The polymers produced by the processes of the invention include linear low density polyethylene, elastomers, plastomers, high density polyethylenes, medium density polyethylenes, and low density polyethylenes.

Polymers that can be made using the described processes can have a variety of compositions, characteristics and properties. At least one of the advantages of the supported, multitransition metal catalysts of the present invention is that the processes utilized can be tailored to form a polymer composition with a desired set of properties. For example, it is contemplated that in certain embodiments in which the supported, multitransition metal catalysts of the present invention comprise bimetallic catalysts, polymers having the same properties as the bimodal polymer compositions in U.S. Pat. No. 5,525,678 can be formed.

The polymers produced by the processes of the present invention, typically ethylene-based polymers, have a density in the range of from 0.860 g/cm³ to 0.970 g/cm³ in one embodiment, from 0.880 g/cm³ to 0.965 g/cm³ in a more particular embodiment, from 0.900 g/cm³ to 0.960 g/cm³ in yet a more particular embodiment, from 0.905 g/cm³ to 0.955 g/cm³ in yet a more particular embodiment, from 0.910 g/cm³ to 0.955 g/cm³ in yet a more particular embodiment, greater than 0.915 g/cm³ in yet a more particular embodiment, greater than 0.920 g/cm³ in yet a more particular embodiment, and greater than 0.925 g/cm³ in yet a more particular embodiment. In another embodiment, the polymers produced by the processes of the present invention have a density in the range of from about 0.940 g/cm³ to about 0.960 g/cm³.

The polymers derived from the use of the supported, multitransitional metal catalysts and processes of the invention have a bulk density of from 0.350 to 0.900 g/cm³ in one embodiment, and from 0.420 to 0.800 g/cm³ in another embodiment, and from 0.430 to 0.500 g/cm³ in yet another embodiment, and from 0.440 to 0.60 g/cm³ in yet another embodiment, wherein a desirable range may comprise any upper bulk density limit with any lower bulk density limit described herein.

The polymers produced by the processes of the present invention have a molecular weight distribution (e.g., a weight average molecular weight to number average molecular weight ($M_w/M_n$)) of from 5 to 100 in one embodiment, of from 10 to 80 in a more particular embodiment, of from 15 to 60 in yet a more particular embodiment, and of from 20 to 50 in yet a more particular embodiment.

The polymers made by the described processes have a melt index (MI) ($I_2$, as measured by ASTM D-1238, 190/2.16) in the range of from 0.01 dg/min to 100 dg/min in one embodiment, from 0.01 dg/min to 50 dg/min in a more particular embodiment, from 0.02 dg/min to 20 dg/min in yet a more particular embodiment, and from 0.03 dg/min to 2 dg/min in yet a more particular embodiment, and from 0.03 dg/min to 1 dg/min in yet a more particular embodiment, wherein a desirable range may comprise any combination of any upper $I_2$ limit with any lower $I_2$ limit.

Polymers made by the method of the invention have an HLMI ($I_{21}$, as measured by ASTM-D-1238, 190/21.6) value that ranges from 0.01 to 50 dg/min in one embodiment, and from 0.1 to 30 in another embodiment, and from 0.5 to 20 in yet a more particular embodiment, and from 3 to 15 in yet a more particular embodiment, and from about 4 to about 15 in a preferred embodiment, and from 5 to 15 in another preferred embodiment, wherein a desirable range is any combination of any upper $I_{21}$ limit with any lower $I_{21}$ limit.

Polymers made by the described processes have a melt index ratio (MIR, or $I_{21}/I_2$) of from 20 to 500 in one embodiment, from 30 to 300 in a more particular embodiment, and from 60 to 200 in yet a more particular embodiment, and from about 70 to about 200 in yet a more particular embodiment. Expressed differently, polymers made by the described processes have a melt index ratio of from greater than 40 in one embodiment, greater than 50 in a more particular embodiment, greater than 60 in yet a more particular embodiment, greater than 65 in yet a more particular embodiment, and greater than 70 in yet a more particular embodiment.

The polymers produced by certain embodiments of the present invention may have a certain average particle size, or APS (determined by using standard sieves), ranging from greater than 150 microns in one embodiment, and from 150 to 2000 microns in a more particular embodiment, and from 150 to 1000 microns in yet another embodiment, and from 300 to 800 microns in yet a more particular embodiment. Fines (e.g., particles having a size less than 125 μm) are typically present to less than 5 wt %, or less than 4 wt %, or less than 3 wt %.

Granules of polymer material are formed from the processes described herein in making the polymer products. Optionally, one or more additives may be blended with the polymer products. In certain preferred embodiments, the polymers of the present invention may be blended and/or coextruded with any other polymer. Non-limiting examples of other polymers include linear low density polyethylenes produced via conventional Ziegler-Natta and/or metallocene-type catalysis, elastomers, plastomers, high pressure low density polyethylene, high density polyethylenes, and the like.

With respect to the physical process of producing the blend of polymers and one or more additives (which one or more additives, as noted above, may include other polymers), sufficient mixing preferably takes place to assure that a uniform blend will be produced prior to conversion into a finished product. One method of blending the additives with the polyolefin is to contact the components in a tumbler or other physical blending means, the polyolefin being in the form of reactor granules. This can then be followed, if desired, by melt blending in an extruder. Another method of blending the components is to melt blend the reactor product with the additives directly in an extruder, Brabender or any other melt blending means, preferably an extruder. Examples of suitable extruders include those made by Farrel and Kobe. While not expected to influence the measured properties of the polymer compositions of the present invention described herein, the density, rheological and other properties of the polymer compositions of the present invention described in the Examples are measured after blending additives with the polymer compositions.

Non-limiting examples of additives include processing aids such as fluoroelastomers, polyethylene glycols and polycaprolactones, antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide.

In particular, antioxidants and stabilizers such as organic phosphites, hindered amines, and phenolic antioxidants may be present in the polymer products of the present invention from 0.001 to 2 wt % in one embodiment, and from 0.01 to 1 wt % in another embodiment, and from 0.05 to 0.8 wt % in yet another embodiment; described another way, from 1 to 5000 ppm by weight of the total polymer composition, and from 100 to 3000 ppm in a more particular embodiment. Non-limiting examples of organic phosphites that are suitable are tris(2,4-di-tert-butylphenyl)phosphite (IRGAFOS 168) and di(2,4-di-tert-butylphenyl)pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944); bis (1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl) propionate (IRGANOX 1010); 1,3,5-Tri(3,5-di-tert-butyl-4-hydroxybenzyl-isocyanurate (IRGANOX 3114); tris(nonylphenyl)phosphite (TNPP); and Octadecyl-3,5-Di-(tert)-butyl-4-hydroxyhydrocinnamate (IRGANOX 1076); other additives include those such as zinc stearate and zinc oleate.

Optionally, fillers also may be included in the polymer products of the present invention. Fillers may be present from 0.01 to 5 wt % in one embodiment, and from 0.1 to 2 wt % of the composition in another embodiment, and from 0.2 to 1 wt % in yet another embodiment and most preferably, between 0.02 and 0.8 wt %. Desirable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, acetylene black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

In total, fillers, antioxidants and other such additives are preferably present to less than 2 wt % in the polyethylene compositions of the present invention, preferably less than 1 wt %, and most preferably to less than 0.8 wt % by weight of the total composition.

Polymers produced by the process of the invention and blends thereof are useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, cable and wire sheathing, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

More particularly, the polymers made by the methods of the present invention are useful in making films. The films may be of any desirable thickness or composition, in one embodiment from 1 to 100 microns, and from 2 to 50 microns in a more particular embodiment, and from 5 to 30 microns in yet a more particular embodiment, and from 5 to 25 microns in a most preferred embodiment; and comprise copolymers of ethylene with a $C_3$ to $C_{10}$ olefin in one embodiment, ethylene with $C_3$ to $C_8$ α-olefins in a particular embodiment, and ethylene with $C_4$ to $C_6$ α-olefins in yet a more particular embodiment. The resins used to make the films may be blended with other additives such as pigments, antioxidants, fillers, etc., as is known in the art, as long as they do not interfere with the desired film properties.

The films that may be made from polymers made by the methods of the present invention may have a Gel Count of less than 100 in one embodiment, and a Gel Count of less than 60 in another embodiment, and a Gel Count of less than 50 in another embodiment, and a Gel Count of less than 40 in yet another embodiment, and a Gel Count of less than 30 in yet another embodiment, and a Gel Count of less than 20 in still another embodiment, and a Gel Count of less than 10 in a most preferred embodiment. As referred to herein, "Gel Count" is defined as the total number of gels having a dimension greater than 300 μm, per square meter of 25 micron film.

The determination of Gel Count for a particular polymer product is further described hereinbelow.

Described alternately, the films may have a Film Appearance Rating ("FAR value") of greater than +20 in one embodiment, and greater than +30 in another embodiment, and greater than +40 in yet another embodiment. "Film Appearance Rating" is an internal test method in which resin is extruded under standard operating guidelines and the resulting film is examined visually for surface imperfections. The film is compared to a reference set of standard film and a FAR rating is assigned based on operator's assessment. This evaluation is conducted by an operator with considerable experience. The FAR reference films are available for the range of −50 to +50. FAR ratings of +20 and better are considered commercially acceptable by customers.

In certain embodiments of the present invention in which the polymers produced from the polymerization processes of the present invention are used to make films, the resultant pelletized polymer compositions of the present invention, with or without additives, are processed by any suitable means for forming films: film blowing or casting and all methods of film formation to achieve, for example, uniaxial or biaxial orientation such as described in PLASTICS PROCESSING (Radian Corporation, Noyes Data Corp. 1986). In a particularly preferred embodiment, the polymer compositions of the present invention may be formed into films such as described in the FILM EXTRUSION MANUAL, PROCESS, MATERIALS, PROPERTIES (TAPPI, 1992). Even more particularly, the films of the present invention may be blown films, the process for which is described generally in FILM EXTRUSION MANUAL, PROCESS, MATERIALS, PROPERTIES pp. 16-29, for example.

Any extruder suitable for extrusion of a HDPE (density greater than 0.940 grams/cm$^3$) operating under any desirable conditions for the polyethylene compositions described herein can be used to produce the films of the present invention. Such extruders are known to those skilled in the art. Such extruders include those having screw diameters ranging from 30 to 150 mm in one embodiment, and from 35 to 120 mm in another embodiment, and having an output of from 100 to 1,500 lbs/hour in one embodiment, and from 200 to 1,000 lbs/hour in another embodiment. In one embodiment, a grooved feed extruder is used. The extruder may possess a L/D ratio of from 80:1 to 2:1 in one embodiment, and from 60:1 to 6:1 in another embodiment, and from 40:1 to 12:1 in yet another embodiment, and from 30:1 to 16:1 in yet another embodiment.

A mono or multi-layer die can be used. In one embodiment a 50 to 200 mm monolayer die is used, and a 90 to 160 mm monolayer die in another embodiment, and a 100 to 140 mm monolayer die in yet another embodiment, the die having a nominal die gap ranging from 0.6 to 3 mm in one embodiment, and from 0.8 to 2 run in another embodiment, and from 1 to 1.8 mm in yet another embodiment, wherein a desirable die can be described by any combination of any embodiment described herein. In a particular embodiment, the advantageous specific throughputs claimed herein are maintained in a 50 mm grooved feed extruder with an LID of 21:1 in a particular embodiment.

The temperature across the zones of the extruder, neck and adapter of the extruder ranges from 150° C. to 230° C. in one embodiment, and from 160° C. to 210° C. in another embodiment, and from 170° C. to 190° C. in yet another embodiment. The temperature across the die ranges from 160° C. to 250° C. in one embodiment, and from 170° C. to 230° C. in another embodiment, and from 180° C. to 210° C. in yet another embodiment.

To facilitate a better understanding of the present invention, the following examples of some exemplary embodiments are given. In no way should such examples be read to limit, or to define, the scope of the invention.

EXAMPLES

Example 1

In the following example, three samples of supported, multitransition metal catalysts were prepared. Two samples are comparative samples, while one sample constitutes a supported, multitransition metal catalyst of the present invention. Specific properties of the samples are displayed in Table 1.

Preparation of Comparative Sample Catalyst 1.

A comparative sample catalyst (referred to herein as Comparative Sample Catalyst Composition No. 1) was prepared as follows. About 2,000 pounds of anhydrous iso-hexane was transferred into a nitrogen-purged, agitated and jacketed reaction vessel. The temperature of the jacket was set at 54° C.

A conventional silica was provided (Davison 955 silica), which typically has the following properties:
Average Particle Size: 40 microns
Surface Area: 300 m$^2$/gram
Porosity: 1.6 cm$^3$/gram
$D_{10}$: 10 microns
$D_{50}$: 40 microns
$D_{90}$: 90 microns
$D_{90}/D_{10}$: 9.0

The conventional silica was dried under nitrogen at 875° C. About 750 pounds of the dehydrated conventional silica then was combined with the anhydrous iso-hexane, while under constant stirring. Once the slurry of silica and hexane reached a temperature of about 40° C., about 525 pounds of a 15 weight % solution of dibutyl magnesium in heptane (supplied by FMC Corporation) was added to the slurry over a period of 35 minutes. The slurry then was mixed for an additional 60 minutes at 54° C.

Butanol (41.1 pounds) was diluted with iso-hexane to form a 65 weight % solution. This pre-diluted solution of butanol in iso-hexane was added into the vessel containing the slurry over 30 minutes, and then the slurry was held at a temperature of 54° C. for 60 minutes while under constant agitation.

Titanium tetrachloride (61.5 pounds) was diluted with iso-hexane to form a 70 weight % solution. This pre-diluted solution of titanium tetrachloride in iso-hexane then was added into the vessel containing the slurry over 45 minutes. Following the addition of the solution, the slurry was allowed to stand for 60 minutes at a temperature of 54° C.

A MAO-metallocene mixture then was added to the slurry. This mixture had been prepared in a separate nitrogen-purged and agitated vessel. This vessel first had received about 975 pounds of a 30 weight % solution of methylaluminoxane (MAO) in toluene (supplied by Albemarle) at ambient temperature. Then, a toluene solution of 18.5 pounds of bis-n-butyl-cyclopentadienyl zirconium difluoride was added into the MAO solution under constant agitation. Mixing of the MAO/metallocene mixture continued for at least 30 minutes.

The MAO/Metallocene mixture then was added via spray nozzle into the first reaction vessel (containing the previously-prepared titanium reaction slurry) over a period of three hours. After the end of the MAO/metallocene addition, agitation continued in the first reaction vessel for another hour. The resulting mixture that included the comparative sample catalyst then was dried at a jacket temperature of 70° C. with vacuum applied until the volatile content was less than 3 weight percent. The comparative sample catalyst then was used in a polymerization run in a gas phase reactor, under the conditions identified in Table 1 to form a polyethylene polymer composition.

Preparation of Comparative Sample Catalyst No. 2

A second comparative sample catalyst (referred to herein as Comparative Sample Catalyst Composition No. 2) was prepared as follows. About 1,100 pounds of anhydrous iso-hexane was transferred into a nitrogen-purged, agitated and jacketed reaction vessel. The temperature of the jacket was set at 54° C.

A conventional silica was provided (Davison 955 silica, as was used in the preparation of Comparative Sample Catalyst No. 1, except that the sample of Davison 955 silica used to prepare Comparative Sample Catalyst No. 2 was dehydrated in air at 875° C., rather than in nitrogen). About 400 pounds of the dehydrated conventional silica then was combined with the anhydrous iso-hexane, while under constant stirring. Once the slurry of silica and hexane reached a temperature of about 40° C., about 280 pounds of a 15 weight % solution of dibutyl magnesium in heptane (supplied by FMC Corporation) was added to the slurry over a period of 60 minutes. The slurry then was mixed for an additional 60 minutes at 54° C.

Butanol (21.9 pounds) was diluted with iso-hexane to form a 65 weight % solution. This pre-diluted solution of butanol in iso-hexane was added into the vessel containing the slurry over 30 minutes, and then the slurry was held at a temperature of 54° C. for 60 minutes while under constant agitation.

Titanium tetrachloride (36.1 pounds) was diluted with iso-hexane to form a 70 weight % solution. This pre-diluted solution of titanium tetrachloride in iso-hexane then was added into the vessel containing the slurry over 45 minutes. Following the addition of the solution, the slurry was allowed to stand for 60 minutes at a temperature of 54° C.

A MAO-metallocene mixture then was added to the slurry. This mixture had been prepared in a separate nitrogen-purged and agitated vessel. This vessel first had received about 520 pounds of a 30 weight % solution of methylaluminoxane (MAO) in toluene (supplied by Albemarle) at ambient temperature. Then, a toluene solution of 15.7 pounds of bis-n-butyl-cyclopentadienyl zirconium difluoride was added into the MAO solution under constant agitation. Mixing of the MAO/metallocene mixture continued for at least 30 minutes.

The MAO/Metallocene mixture then was added via spray nozzle into the first reaction vessel (containing the previously-prepared titanium reaction slurry) over a period of three hours. After the end of the MAO/metallocene addition, agitation continued in the first reaction vessel for another hour. The resulting mixture that included the comparative sample catalyst then was dried at a jacket temperature of 70° C. with vacuum applied until the volatile content was less than 3 weight percent. The comparative sample catalyst then was used in a polymerization run in a gas phase reactor, under the conditions identified in Table 1 to form a polyethylene polymer composition.

Preparation of Catalyst Compositions of the Present Invention.

A sample catalyst composition of the present invention (Sample Catalyst Composition No. 3) then was prepared as follows. About 1,100 pounds of anhydrous iso-hexane was transferred into a nitrogen-purged, agitated and jacketed reaction vessel. The temperature of the jacket was set at 54° C.

A silica having an improved particle size distribution was provided (Ineos ES-757 silica), which typically has the following properties:

Average Particle Size: 25 microns
Surface Area: 300 m²/gram
Porosity: 1.6 cm³/gram
$D_{10}$: 10 microns
$D_{50}$: 25 microns
$D_{90}$: 44 microns
$D_{90}/D_{10}$: 4.4

The Ineos ES-757 silica was dried in air at 875° C. About 400 pounds of the dehydrated Ineos ES-757 silica then was combined with the anhydrous iso-hexane, while under constant stirring. Once the slurry of Ineos ES-757 silica and iso-hexane reached a temperature of about 40° C., about 280 pounds of a 15 weight % solution of dibutyl magnesium in heptane (supplied by FMC Corporation) was added to the slurry over a period of 150 minutes. The slurry then was mixed for an additional 60 minutes at 54° C.

Butanol (21.9 pounds) was diluted with iso-hexane to form a 65 weight % solution. This pre-diluted solution of butanol in iso-hexane was added into the vessel containing the slurry over 30 minutes, and then the slurry was held at a temperature of 54° C. for 60 minutes while under constant agitation.

Titanium tetrachloride (39.2 pounds) was diluted with iso-hexane to form a 70 weight % solution. This pre-diluted solution of titanium tetrachloride in iso-hexane then was added into the vessel containing the slurry over 45 minutes. Following the addition of the solution, the slurry was allowed to stand for 60 minutes at a temperature of 54° C.

A MAO-metallocene mixture then was added to the slurry. This mixture had been prepared in a separate nitrogen-purged and agitated vessel. This vessel first had received about 520 pounds of a 30 weight % solution of methylaluminoxane (MAO) in toluene (supplied by Albemarle) at ambient temperature. Then, a toluene solution of 14.1 pounds of bis-n-butyl-cyclopentadienyl zirconium difluoride was added into the MAO solution under constant agitation. Mixing of the MAO/metallocene mixture continued for at least 30 minutes.

The MAO/Metallocene mixture then was added via spray nozzle into the first reaction vessel (containing the previously-prepared titanium reaction slurry) over a period of three hours. After the end of the MAO/metallocene addition, agitation continued in the first reaction vessel for another hour. The resulting mixture that included the sample catalyst of the present invention then was dried at a jacket temperature of 70° C. with vacuum applied until the volatile content was less than 3 weight percent. The sample catalyst of the present invention then was used in a polymerization run in a gas phase reactor, under the conditions identified in Table 1 to form a polyethylene polymer composition.

Fluid-Bed Polymerization.

The polymerizations were conducted in a continuous gas phase fluidized bed reactor. The fluidized bed is made up of polymer granules. The gaseous feed streams of ethylene and hydrogen together with liquid comonomer were mixed together in a mixing tee arrangement and introduced into the recycle gas line upstream of the reactor bed. Monomers of 1-butene were used as the comonomer. The individual flow rates of ethylene, hydrogen and comonomer were controlled to maintain fixed composition targets. The ethylene concentration was controlled to maintain a constant ethylene partial pressure of about 175 psia. The hydrogen was controlled to maintain a constant hydrogen-to-ethylene mole ratio of about 0.011. Similarly, the ratio of the flow rate to the reactor of 1-butene to that of ethylene was controlled at about 0.013 pounds of 1-butene per pound of ethylene. When oxygen was fed to the reactor as an antifoulant, the feedrate was 0.25 pounds of oxygen per million pounds of ethylene. The concentration of all the gases were measured by an on-line gas chromatograph to ensure relatively constant composition in the recycle gas stream.

The solid catalyst was injected directly into the fluidized bed using purified nitrogen as a carrier. Trimethylaluminum (TMA) was injected into the recycling gas as a cocatalyst for the Ziegler-Natta catalyst. Its rate was adjusted to maintain a constant TMA-to-ethylene mass flow ratio. The reacting bed of growing polymer particles is maintained in a fluidized state by the continuous flow of the make up feed and recycle gas through the reaction zone. A superficial gas velocity of 1-3 ft/sec was used to achieve this. The reactor was operated at a total pressure of about 270 psig. To maintain a constant reactor fluidized bed temperature, the temperature of the recycle gas is continuously adjusted up or down to accommodate any changes in the rate of heat generation due to the polymerization.

The fluidized bed ws maintained at a constant height by withdrawing a portion of the bed at a rate equal to the rate of formation of particulate product. The product is removed semi-continuously via a series of valves into a fixed volume chamber. The reactor gas removed with the product during a discharge is vented to a flare, and not recycled back to the reactor. The product is purged to remove entrained hydrocarbons and treated with a small stream of humidified nitrogen to deactivate any trace quantities of residual catalyst and cocatalyst.

The catalyst activity may be calculated using titanium as a basis by dividing the titanium content of the catalyst by the residual titanium content found in the product. The titanium content of the product was determined using a calibrated x-ray fluorescene technique. Linear relations were used to correct catalyst activity for any differences in ethylene partial pressure and reactor residence time between polymerization runs.

Resin Properties.

The properties of the polymer were determined by the following test methods:

1. Melt Index: ASTM D-1238-Condition E. The resin is melt-blended (compounded) with 1500 ppm I-1010, 1500 ppm I-168, and 500 ppm zinc stearate (ZnSt), pelletized, and measured on a Goettfert plastometer instrument type 011.5/2001, following ASTM D-1238-190° C./2160 grams using a five-minute cut.
2. Density: ASTM D-105. The resin is melt-blended with 1500 ppm I-1010, 1500 ppm 1-168, and 500 ppm ZnSt, pelletized, compression molded according to ASTM 4703-03 with a 40 hour conditioning time and density gradient column according to ASTM D1505-03.
3. Bulk Density: The resin is poured via a ⅞ inch diameter funnel into a fixed volume cylinder of 400 cc. The bulk density is measured as the weight of resin divided by 400 cc to give a value in g/cc.
4. Dynamic Rheology: The resin is melt-blended with 1500 ppm I-1010, 1500 ppm I-168, and 500 ppm ZnSt, pelletized, and pressed into a disk 25 mm in diameter and 2.0 mm thick. Measurement occurred on a Rheometrics SR 5000 using 25 mm plates, a 1.5 mm die gap at 200° C. and a frequency of 0.1 to 100 rad/sec.
5. Flow Index: Resin is melt-blended with 1500 ppm I-1010, 1500 ppm 1-168, and 500 ppm ZnSt, pelletized, and measured on a Goettfert plastometer instrument type 011.5/2001, primarily following ASTM D-1238-190° C./21600 grams timed method. Exceptions to the ASTM-D1238-190° C./21600 are the use of a full 1 inch travel for resins with a flow index less than 10 dg/min and the total time that the resin is in the plastometer prior to initiating measurement is 7-10 minutes rather than the 6.5 to 7.5 min specified in the ASTM procedure.
6. XRF: ASTM procedure D 6247-98 (reapproved 2004). Calibration standards were prepared from bimodal HDPE material from actual production runs that were independently analyzed for metals content by Elemental Analysis, Inc., of Lexington, Ky.
7. GPC: Polymer solutions were prepared in filtered 1,2,4-Trichlorobenzene containing about 250 ppm of butylated hydroxy toluene (BHT). The same solvent was used as the SEC eluent. Polymer solutions were prepared by dissolving the desired amount of dry polymer in the appropriate volume of SEC eluent to yield concentrations ranging from 1.0 to 1.5 mg/ml. The sample vials were capped and placed in an air oven for 2 hours at 160° C. The instrument used was a Waters Alliance 2000 gel permeation chromatograph equipped with a Waters differential refractometer that measures the difference between the refractive index of the solvent and that of the solvent containing the fractionated polymer. The system was used at 145 C, a nominal flow rate of 1.0 mL/min and a nominal injection volume of 300 microliters. Three Polymer Laboratories (PL) gel Mixed-B columns were used.

The separation efficiency of the column set was calibrated using a series of narrow MWD polystyrene standards, which reflects the expected molecular weight (MW) range for samples, and the exclusion limits of the column set. At least 10 individual polystyrene standards, ranging from $M_p$ of about 580 to 10,000,000 were used to generate the calibration curve. The polystyrene standards were obtained from Polymer Laboratories of Amherst, Mass., or an equivalent source. To assure internal consistency, the flow rate was corrected for each calibrant run, to give a common peak position for the flow rate marker (taken to be the positive inject peak) before determining the retention volume for each polystyrene standard. The flow marker peak position thus assigned was also used to correct the flow rate when analyzing samples.

A calibration curve (log $M_p$ v. retention volume) was generated by recording the retention volume at the peak in the DRI signal for each polystyrene standard, and fitting this data set to a 2nd-order polynomial. Polystyrene standards were graphed using Viscotec 3.0 software. Samples were analyzed using WaveMetrics, Inc. IGOR Pro and Viscotec 3.0 software, using updated calibration constants.

Each catalyst was evaluated in the fluidized bed reactor, wherein the residence time varied from about 4-6 hours. Each run was conducted using the same continuous gas phase fluidized bed reactor. The fluidized bed of that reactor was made up of polymer granules. During each run, the gaseous feed streams of ethylene and hydrogen were introduced upstream of the reactor bed into the recycle gas line. Butene comonomer also was introduced into the recycle gas line upstream of the reactor bed. The individual flows of ethylene and hydrogen were controlled to maintain fixed composition targets. The concentrations of gases were measured by an on-line chromatograph.

Gel Count Test Procedure

The gel content of the polymer products was tested by the OCS Method. The equipment used consisted of an Optical Control Systems GmbH(OCS) Model ME-20 extruder, and OCS Model CR-8 cast film system, and an OCS Model FS-5 gel counter.

The ME-20 extruder consists of a ¾" standard screw with 3/1 compression ratio, and 25/1 L/D. It includes a feed zone, a compression zone, and a metering zone. The extruder utilizes all solid state controls, a variable frequency AC drive for the screw, 5 heating zones including 3 for the barrel, 1 for the melt temp and pressure measurement zone, and one for the die. The die is a 4" fixed lip die of a "fishtail" design, with a die gap of approx. 20 mils.

The cast film system includes dual stainless steel chrome plated and polished chill rolls, a machined precision air knife, rubber nip rolls that pull the film through the gel counter, and a torque driven wind up roll. The nip rolls are driven separately from the chill rolls and are controlled by speed or tension. A circulation cooling/heating system for the chill rolls is also included, and utilizes ethylene glycol. Steel SS rails, film break sensors, and other items are included.

The gel counter consists of a digital 2048 pixel line camera, a halogen based line lighting system, an image processing computer, and Windows NT4 software. The camera/light system is mounted on the cast film system between the chill roll and nip rolls, and is set up for a 50-micron resolution on film. This means that the smallest defect that can be seen is 50 microns by 50 microns in size. The OCS cast film system is designed to provide the highest quality and most consistent film possible for the gel measurement.

The pellet samples were run with constant extruder temperatures (180 C for the feed zone, 190 C for all remaining zones), and constant chill roll temperature of 40 C. The extruder and chill roll speeds had to be varied somewhat between samples to provide an optimum film for each sample.

The gel counter was set up with 10 different size classes beginning at 50-100 microns and increasing at 100 micron intervals, 4 different shape classes beginning with a perfect circular shape and increasing to more oblong shapes, and two detection levels (one for gels and one for black specks). The gel detection level or sensitivity used is normally set to 35.

Once the camera set up parameters were determined, the extruder was purged with the first sample (typically about 20 minutes) or until it was apparent that the test conditions were at steady state, or "equilibrium". This was done by looking at a trend line chart of gel count number on the "y" axis, and time on the "x" axis. Tests were then run on 4-9 square meters of film, typically of 25 μm gauge. As noted above, "Gel Count" is defined as the total number of gels having a dimension greater than 300 μm, per square meter of 25 micron film.

In Table 1 below, gel count results are reported as the total number of gels greater than 300 μm per square meter of film.

The results of the abovedescribed Example are further illustrated with reference to FIGS. 1 and 2. Referring now to FIG. 1, the polymers produced from Sample Catalyst Composition 3 (a supported, multitransition metal catalyst of the present invention) demonstrate a narrower particle size distribution as compared to those produced from Comparative Sample Catalyst Compositions Nos. 1 and 2; this narrower particle size distribution is believed to be attributable to the narrower particle size distribution of the improved supports of the present invention. Referring now to FIG. 2, the polymers produced from Sample Catalyst Composition 3 demonstrate a reduced gel count as compared to those produced from Comparative Sample Catalyst Compositions Nos. 1 and 2; this also is believed to be attributable to the narrower particle size distribution of the improved supports of the present invention.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

TABLE 1

|  | Comparative Sample Catalyst Comp. No. 1 | Comparative Sample Catalyst Comp. No. 2 | Comparative Sample Catalyst Comp. No. 2 | Sample Catalyst Comp. No. 3 |
| --- | --- | --- | --- | --- |
| Oxygen Antifoulant | Yes | Yes | No | No |
| FI [dg/min] | 11.1 | 13.3 | 12.1 | 6.3 |
| MI [dg/min] | 0.0805 | 0.0985 | 0.0985 | 0.0705 |
| MFR | 138 | 135 | 123 | 90 |
| MFR@10FI | 130 | 112 | 108 | 116 |
| GP 0.1 [dyne/cm$^2$] | 46639 | 32334 | 33504 | 38739 |
| GPP 0.1 [dyne/cm$^2$] | 84498 | 64142 | 62894 | 78266 |
| Elasticity | 0.55 | 0.50 | 0.53 | 0.49 |
| Density[1] [g/cc] | 0.952 | 0.953 | 0.953 | 0.951 |
| Eta 0.1 [P] | 965250 | 718310 | 712620 | 931385 |
| Eta 100 [P] | 28343 | 20784 | 20144 | 29739 |
| Eta 0.1/100 | 34 | 35 | 35 | 31 |
| Ti [ppm] | 1.79 | 2.23 | 1.72 | 1.43 |
| Al [ppm] | 54.61 | 51.98 | 49.69 | 48.84 |
| Cat_Ti [wt. %] | 1.25 | 1.31 | 1.31 | 1.45 |
| Cat_Al [wt. %] | 10.29 | 10.36 | 10.36 | 10.39 |
| Productivity (gram PE/gram catalyst) | 6972 | 5864 | 7596 | 10119 |
| LMW_Mw[2] [Daltons] | 4801 | 6343 | 6451 | 6881 |
| HMW_Mw[2] [Daltons] | 442869 | 441048 | 413055 | 390875 |
| Gel Count [#>300 um/SqM] | 50 | 59 | 53 | 6 |

[1]Determined via the ASTM method.
[2]Determined from a data fit using a Wesslau distribution.

For the purpose of legal systems outside the United States in which preferred or optional features can be linked to or be dependent on multiple other features in the claims (such as under the European Patent Convention) specific embodiments are set forth as follows:

(1) A supported, multi-transition-metal catalyst composition comprising:
  (a) at least two catalyst components selected from the group consisting of: a nonmetallocene catalyst component and a metallocene catalyst component;
  (b) a support material that has a $D_{50}$ of less than 30 microns and a particle size distribution having a $D_{90}/D_{10}$ ratio of less than 6; and
  (c) an activator.
(2) The supported catalyst composition of claim 1, wherein the support material comprises silica.
(3) The supported catalyst composition of either claim 1 or claim 2, wherein the nonmetallocene catalyst component is a Ziegler-Natta catalyst component that comprises a nonmetallocene transition metal compound selected from the group consisting of Group 4 and Group 5 halides, oxides, oxyhalides, alkoxides, and mixtures thereof.
(4) The supported catalyst composition of any of claims 1-3, wherein the activator comprises aluminum.
(5) A process for making polyolefins, comprising contacting monomers with the supported catalyst composition of any one or all of claims 1-4 for a time sufficient to form a multimodal polyolefin composition.
(6) A polymer product made from the process of claim 5.
(7) An extruded pellet of the polymer product of claim 6.
(8) A film made from the polymer product of claim 6.
(9) The film of claim 8 having a gel count of less than 30.
(10) The film of claim 8 having a gel count of less than 10.

What is claimed is:

1. A process for producing a polyolefin composition comprising:
   contacting hydrogen and ethylene monomers with a supported multi-transition-metal catalyst composition to form a polyolefin composition; wherein the supported multi-transition-metal catalyst composition comprises:
   (a) at least two catalyst components selected from the group consisting of: a nonmetallocene catalyst component and a metallocene catalyst component;
   (b) a support material that has a $D_{50}$ of less than about 30 microns, a $D_{90}$ of less than about 50 microns, and a particle size distribution having a $D_{90}/D_{10}$ ratio of less than about 6; and
   (c) an activator;
   wherein the nonmetallocene catalyst component is a Ziegler-Natta catalyst component that comprises a nonmetallocene transition metal compound selected from the group consisting of Group 4 and Group 5 halides, oxides, oxyhalides, alkoxides, and mixtures thereof; and
   the metallocene catalyst component is represented by the formula:

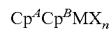

$Cp^A Cp^B MX_n$ wherein each $Cp^A$ and $Cp^B$ are the same or different and are substituted cyclopentadienyl rings, each bound to M; M is a Group 4 atom; X is selected from the group consisting of $C_1$ to $C_6$ alkyls, $C_6$ aryls, $C_7$ to $C_{12}$ alkylaryls, fluorinated $C_1$ to $C_6$ alkyls, fluorinated $C_6$ aryls, fluorinated $C_7$ to $C_{12}$ alkylaryls, chlorine and fluorine; n is 1 or 2; characterized in that at least one X is a fluorine or fluorinated hydrocarbonyl; and
   wherein a film made from the polyolefin has a Gel Count less than 30.

2. The process of claim 1, wherein the support material comprises silica.

3. The process of claim 1, wherein the support comprises an amorphous silicon dioxide having a pore volume range from 1.5 to 2.0 cm³/g and a surface area of from 280 to 350 m²/g with a $D_{90}$ of about 44 microns, a $D_{50}$ of about 25 microns, and a $D_{10}$ of about 10 microns.

* * * * *